(12) United States Patent
Lambert et al.

(10) Patent No.: US 7,681,925 B2
(45) Date of Patent: Mar. 23, 2010

(54) PUSH-TO-CONNECT MECHANISM AND METHOD, FOR A COUPLING

(75) Inventors: Todd D. Lambert, Brooklyn Park, MN (US); Shawn D. Ellis, Golden Valley, MN (US); Brian K. Forner, Saint Louis Park, MN (US)

(73) Assignee: Parker-Hannfin Corporation, Cleveland, OH (US)

( * ) Notice: Subject to any disclaimer, the term of this patent is extended or adjusted under 35 U.S.C. 154(b) by 797 days.

(21) Appl. No.: 11/422,606

(22) Filed: Jun. 7, 2006

(65) Prior Publication Data

US 2007/0170719 A1 Jul. 26, 2007

Related U.S. Application Data

(60) Provisional application No. 60/757,163, filed on Jan. 6, 2006.

(51) Int. Cl.
*F16L 37/18* (2006.01)
(52) U.S. Cl. .................. 285/316; 285/376; 285/402
(58) Field of Classification Search ................ 285/23, 285/39, 81, 86, 376, 377, 401, 402, 316, 285/317
See application file for complete search history.

(56) References Cited

U.S. PATENT DOCUMENTS

| | | | | |
|---|---|---|---|---|
| 828,243 | A | * | 8/1906 | Polman, J .................. 285/376 |
| 1,910,152 | A | * | 5/1933 | Durfey ...................... 285/362 |
| 3,162,470 | A | * | 12/1964 | Davidson et al. ............. 285/86 |
| 3,470,524 | A | * | 9/1969 | Culver ....................... 285/362 |
| 4,527,745 | A | * | 7/1985 | Butterfield et al. .......... 285/376 |
| 5,741,084 | A | * | 4/1998 | Del Rio et al. .............. 285/402 |

OTHER PUBLICATIONS

Two drawings of Parker-Hannifin Corporation representing Kodiak nozzle and receptacle, dated May 9, 2002 and Jul. 2, 2002.
Drawing of Parker-Hannifin Corporation representing LGO liquid nitrogen nozzle and receptacle, dated Aug. 7, 1996.
Drawing of Parker-Hannifin Corporation representing Caire style coupler assembly dated Jul. 24, 1996.
Cryofab Home Care Liquid Oxygen Respiratory Systems, Products and Services, Quick Disconnect Valves, copyrighted 2005.

* cited by examiner

*Primary Examiner*—Aaron M Dunwoody
(74) *Attorney, Agent, or Firm*—John A. Molnar, Jr.

(57) ABSTRACT

Improvement in a quick disconnect coupling that includes a tubular coupler half, having a radially outwardly-directed roller on an outer surface portion thereof; a tubular nipple half, having a push-to-connect mechanism, including a cup-shaped member, concentrically surrounding a nipple body portion, this mechanism including a locking device having a basically L-shaped contoured slot including a helically-directed ramp inlet and a locking slot portion; the improvement comprising that the push-to-connect mechanism includes the rotatable journaling of the cup-shaped member, for limited rotational pivoting relative to the nipple half; this mechanism also including a biasing member for concurrently normally biasing the cup-shaped member to an at-rest position relative to the nipple body. A method for joining includes an initial contact between the axially-aligned roller and the helical ramp; further interaction rotationally displacing the cup shaped member until the roller enters the locking portion, resulting in reverse pivoting of the cup-shaped member.

16 Claims, 12 Drawing Sheets

PUSH-TO-CONNECT MECHANISM AND METHOD, FOR A COUPLING

CROSS-REFERENCE TO RELATED CASES

The present application claims the benefit of the filing date of U.S. Provisional Application Ser. No. 60/757,163, filed Jan. 6, 2006, the disclosure of which is incorporated herein by reference. Reference is also made to co-pending U.S. patent application Ser. No. 11/186,534, entitled "Cryogenic Coupling", filed on Jul. 21, 2005, which is also incorporated herein by reference.

FIELD OF THE INVENTION

The present invention pertains to couplings, such as quick disconnect couplings, that include a tubular coupling half and a tubular nipple, with these couplings being adapted to be operatively sealingly interconnected. More particularly, the invention pertains to the use of a push-to-connect mechanism, including a cup-shaped member, surrounding the nipple body. The improvement includes the rotational journaling of the cup-shaped member and the normal biasing thereof to an at rest position. The limited pivotal movement of the push-to-connect mechanism permits operative coupling of a coupler half roller with the locking portion of a nipple half contoured slot as the cup-shaped member is being biased back to its at-rest position.

BACKGROUND OF THE INVENTION

This invention represents an improvement over above-noted co-pending U.S. patent application Ser. No. 11/186,534, which is also assigned to the assignee of the present invention, with a more detailed discussion following hereinafter.

The Parker-Hannifin Corporation of Cleveland, Ohio U.S.A., the assignee of the noted inventions, manufactures and markets an LGO series and a Kodiak series of nozzles and receptacles that utilize a connecting and locking device related to the one used in the present invention, with a helical slot and roller design being utilized for connecting and disconnecting the coupler and nipple halves. In these noted mechanisms, the connection/disconnection is made by manually turning one half of the coupling while the other half is mounted in a fixed relative position. In other words, the locking collars are twisted while the coupling bodies move axially.

Caire Products of Marietta, Ga., U.S.A. and Sunrise Medical Pulsair/Devilbiss of Carlsbad, Calif., U.S.A. also use a related helical slot and pin design which is used to connect the coupler and nipple halves in cryogenic fill applications. These mechanisms also require that one of the coupling halves be turned to make the connection of that coupling half while the remaining coupling half is mounted in a fixed position. In other words, these connectors require that one of the coupling halves be rotated or twisted. In some cases, this requires that the entire product, to which coupling is attached, must be rotated.

As previously noted, helical slot constructions have already been utilized as locking devices in fluid-transfer couplings. However, each of the identified styles requires that one of the two coupling halves be mounted in a fixed position, with the locking or connecting action being performed by turning or twisting either one of the coupling halves or at least a part of the coupling.

The device or mechanism of the present invention differs from the noted prior art constructions in that only the locking device moves and/or rotates when the connection is made in an axially-directed manner. A biasing member is utilized to make an automatic connection, with no manual twisting or turning being required to achieve the desired connection. For disconnection, in an operator-induced manual action, the sliding of a lever releases the connection, with the biasing member then returning the locking mechanism to its home or at-rest position, ready for another connection. A further unique feature of the present invention is the addition of a coupling-misconnect prevention mechanism that inhibits the connection with a coupler half other than its specific mating coupler.

SUMMARY OF THE INVENTION

Accordingly, in order to overcome the deficiencies of the prior art devices, the present invention provides an improved Push-to-Connect Helical Slot Mechanism (P-t-CHSM) or Push-to-Connect mechanism and an implementation method for couplings, such as quick disconnect couplings.

Specifically, in terms of structure, a first embodiment of this invention pertains to an improvement in a quick disconnect coupling that includes: a. a coupler half having a centrally apertured, shaped, generally tubular body; an inner coupler end incorporating a tapered inlet portion and an adjoining internal sealing arrangement; and a generally cylindrical outer surface portion including at least one radially outwardly-directed roller; b. a nipple half having a centrally apertured, shaped, generally tubular body; an inner body end with a central end aperture; a push-to-connect mechanism including a cup-shaped member concentrically surrounding the inner body, having at least one locking device that includes a basically L-shaped contoured slot having a helically-directed, angled, ramp inlet portion and a locking slot portion; the coupler and nipple halves being adapted to be axially interconnected, with the nipple inner body end being sealingly received within the coupler half internal sealing arrangement, the coupling halves being interconnected via the coupler half roller being received within the locking slot portion of the nipple half cup-shaped member, wherein the improvement comprises: c. the push-to-connect mechanism including the rotatable journaling of the cup-shaped member, on the nipple half tubular body, for limited rotational pivoting relative thereto; and d. the push-to-connect mechanism also including a biasing member for concurrently normally biasing the cup-shaped member to an at-rest position, relative to the nipple half tubular body.

In one version thereof, the coupler half includes a pair of diametrically opposed rollers and the nipple half includes a pair of diametrically opposed locking devices. In one variation thereof, the cup-shaped member further includes a radially outwardly-directed operator actuating handle for pivoting the cup-shaped member against the biasing action of the biasing member, while in another variation thereof, the actuating handle extends radially outwardly from an outer end portion of the cup-shaped member.

In another version, the biasing member takes the form of a tensioned spring, while in a differing version, the push-to-connect mechanism further includes an anti-freeze bearing, interposed between the nipple half tubular body and the cup-shaped member for preventing the cup-shaped member from freezing to the nipple half tubular body in low temperature operating conditions.

In a further version, the push-to-connect mechanism further includes a generally annular retainer for retaining the biasing member, the retainer being secured, against rotation, on the nipple half body and having one end of the biasing member secured thereon. In a first variation of this version, the retainer includes spaced, parallel, flange portions, including at least one intermediate flat surface area portion. In a second variation of this version, a circular end portion of the cup-shaped member includes at least one axially extending pin member, the pin member extending into the retainer flat surface area portion, with lateral ends of the flat surface area portion serving to limit the rotational/pivotal movement of the cup-shaped member relative to the nipple half tubular body. In yet a third variation, another end of the biasing member is secured to the circular end portion of the cup-shaped member, with the rotational/pivotal movement of the cup-shaped member further tensioning the biasing member.

In still a differing version, the cup-shaped member further includes, on an internal peripheral surface thereof a coupling-misconnect prevention mechanism for preventing the connection with coupler halves other than the coupler half. In one a variation of this version, the coupling-misconnect prevention mechanism includes at least one radially inwardly-projecting ridge while in another variation, the ridge is peripherally-extending and one of continuous and segmented. In yet a further variation, the coupling-misconnect prevention mechanism includes at least one of a plurality of peripherally and axially spaced individual ridges.

Another embodiment of this invention, in a quick disconnect coupler half and nipple half assembly combination, pertains to a method for operatively and lockingly interconnecting the coupler and nipple halves, the method including the steps of: a. axially aligning the coupler and nipple halves, with the coupler half including an outer surface portion having at least one radially outwardly-directed roller axially aligned with a push-to-connect mechanism including a locking device, having a basically L-shaped contoured slot, in a cup-shaped member rotatably journalled on the nipple half, the cup-shaped member being normally biased, in one rotational direction, for limited rotational pivoting relative to the nipple half, to an at-rest position, by a tensioned biasing member; b. making initial axial contact between the roller and a helically-directed, angular, inlet ramp portion of the cup member L-shaped slot; and c. continuing further axial interaction between the roller and the inlet ramp portion, thereby rotationally pivotally displacing the cup-shaped member in opposition to the normally biased rotational direction and thereby further tensioning the biasing member until the roller enters a circumferentially-extending locking slot portion of the contoured slot, causing the biasing member to automatically pivot the cup-shaped member back to its at-rest position, causing the roller to reside in the distal end of the locking slot portion, resulting in the push-to-connect mechanism locking the assembly combination together.

One version of this assembly method further includes a subsequent disassembly method, the disassembly method including the additional steps of: d. manually biasing the cup-shaped member in a rotational direction, in opposition to the normally biased rotational direction of the tensioned biasing member, until the roller enters an axially extending outlet portion of the contoured slot; and e. axially separating the assembly combination until the roller is fully axially removed from the cup-shaped member, with removal of the manual biasing of the cup-shaped member causing same to automatically pivot back to its at-rest position.

A further embodiment of this invention pertains to a quick disconnect coupling that comprises in combination: a. a coupler assembly having a centrally apertured, shaped, generally tubular body; an inner coupler end incorporating a tapered inlet portion and an adjoining internal sealing arrangement; and a generally cylindrical outer surface portion including a pair of radially outwardly-directed rollers; b. a nipple assembly having a centrally apertured, shaped, generally tubular body; an inner body end with a central end aperture; a push-to-connect mechanism including a cup-shaped member concentrically surrounding the inner body, having a pair of opposed locking devices, each including a basically L-shaped contoured slot having a helically-directed, angled, ramp inlet portion and a locking slot portion; the coupler and nipple assemblies being adapted to be axially interconnected, with the nipple inner body end being sealingly received within the coupler assembly internal sealing arrangement, the coupling assemblies being interconnected via the coupler assembly rollers being received within respective ones of the locking slot portions of the nipple assembly cup-shaped member; c. the push-to-connect mechanism including the rotatable journaling of the cup-shaped member, on the nipple assembly tubular body, for limited rotational pivoting relative thereto; and d. the push-to-connect mechanism also including a biasing member for concurrently normally biasing the cup-shaped member to an at-rest position, relative to the nipple assembly tubular body.

In one version of this combination, the cup-shaped member further includes a radially outwardly-directed operator actuating handle for manually pivoting the cup-shaped member against the action of the biasing member. In a variation thereof the actuating handle extends radially outwardly from the cup-shaped member.

In another version, the biasing member takes the form of a tensioned spring, while in a differing version, the push-to-connect mechanism further includes an anti-freeze bearing, interposed between the nipple assembly tubular body and the cup-shaped member for preventing the cup-shaped member from freezing to the nipple assembly tubular body during low temperature operating conditions.

In a further version, the push-to-connect mechanism further includes a generally annular retainer for confining the tensioned spring, the retainer being secured, against rotation, on the nipple assembly body and having one end of the tensioned spring secured thereon. In one variation of this version, the retainer includes spaced, parallel, flange portions, including at least one intermediate flat surface portion, while in another variation thereof an end portion of the cup-shaped member includes at least one axially extending pin member, the pin member extending into the retainer flat surface area portion, with lateral ends of the flat surface area portion serving to limit the rotational/pivotal movement of the cup-shaped member relative to the nipple assembly tubular body. In a further variation thereof, another end of the tensioned spring is secured to the end portion of the cup-shaped member, with the rotational/pivotal movement of the cup-shaped member, in one direction, further tensioning the spring.

In an additional version, the cup-shaped member further includes, on an inner peripheral surface thereof a coupling-misconnect prevention mechanism for preventing the connection with coupler assemblies other than the coupler assembly. In one variation thereof, the coupling-misconnect prevention mechanism includes at least one radially inwardly-projecting rib, while in a variation thereof the rib is peripherally-extending and one of continuous and segmented. In a further variation, the coupling-misconnect prevention mechanism includes at least one of a plurality of peripherally and/or axially spaced individual tabs.

In a final version thereof, at least portions of the pair of opposed, basically L-shaped, slots are similarly circumferentially directed.

The previously-described advantages and features, as well as other advantages and features, will become readily apparent from the detailed description of the preferred embodiments that follow.

DETAILED DESCRIPTION OF THE INVENTION

Referring now to the several drawings, illustrated in FIGS. 1-5 and 7-8 is the Push-to-Connect Helical Slot Mechanism (PtCHSM) 16 of this invention as utilized on a nipple half or assembly 18 for rotatably interlocking nipple half 18 with a mating coupler half or assembly 20, which together comprise a quick disconnect coupling 14. Specifically, FIGS. 1-5 progressively show the initial axial alignment (FIGS. 1 and 2) subsequent mating (FIG. 3), locking (FIG. 4) and unlocking (FIG. 5) sequences of quick disconnect coupling 14.

Figure 1:
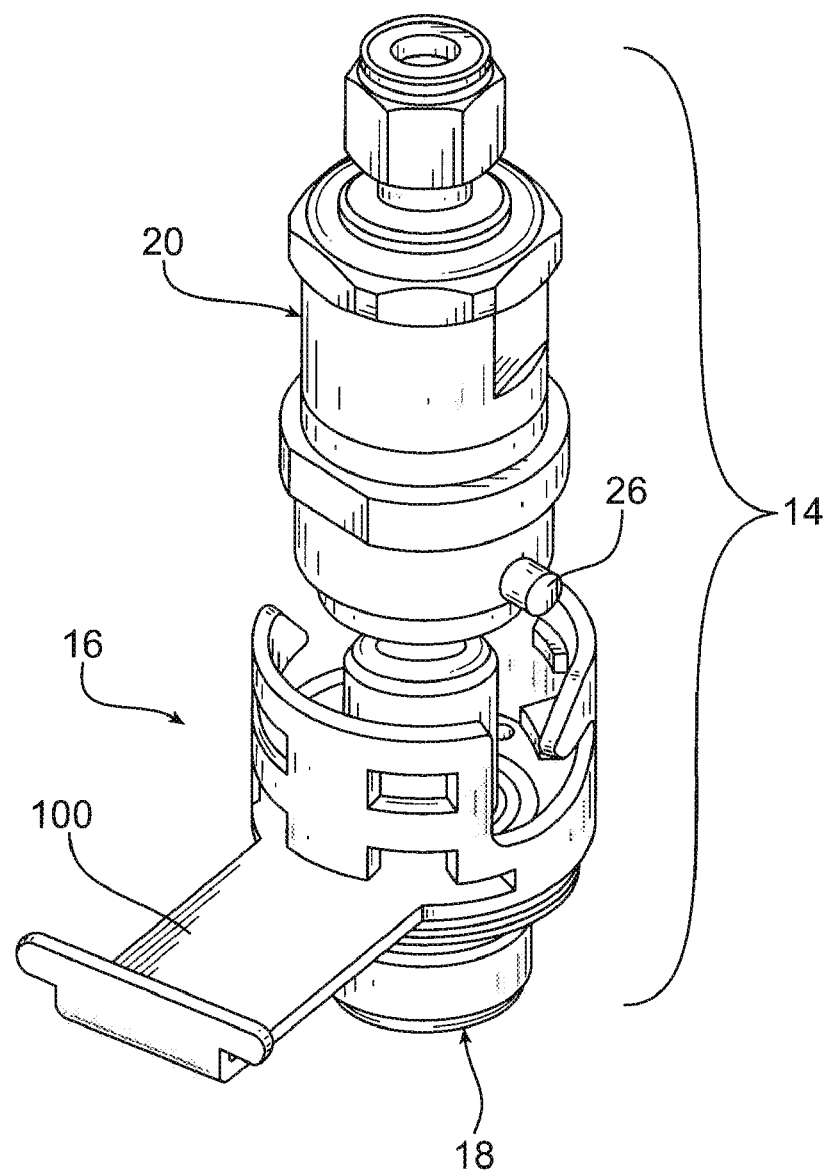
FIG. 1 is a perspective view of a nipple assembly utilizing the push-to-connect helical slot mechanism (PtCHSM) of the present invention for rotatably interlocking same with a mating coupler assembly which together comprise a quick disconnect coupling, showing both prior to the assembly of the axially aligned nipple and coupler halves.
Figure 2:
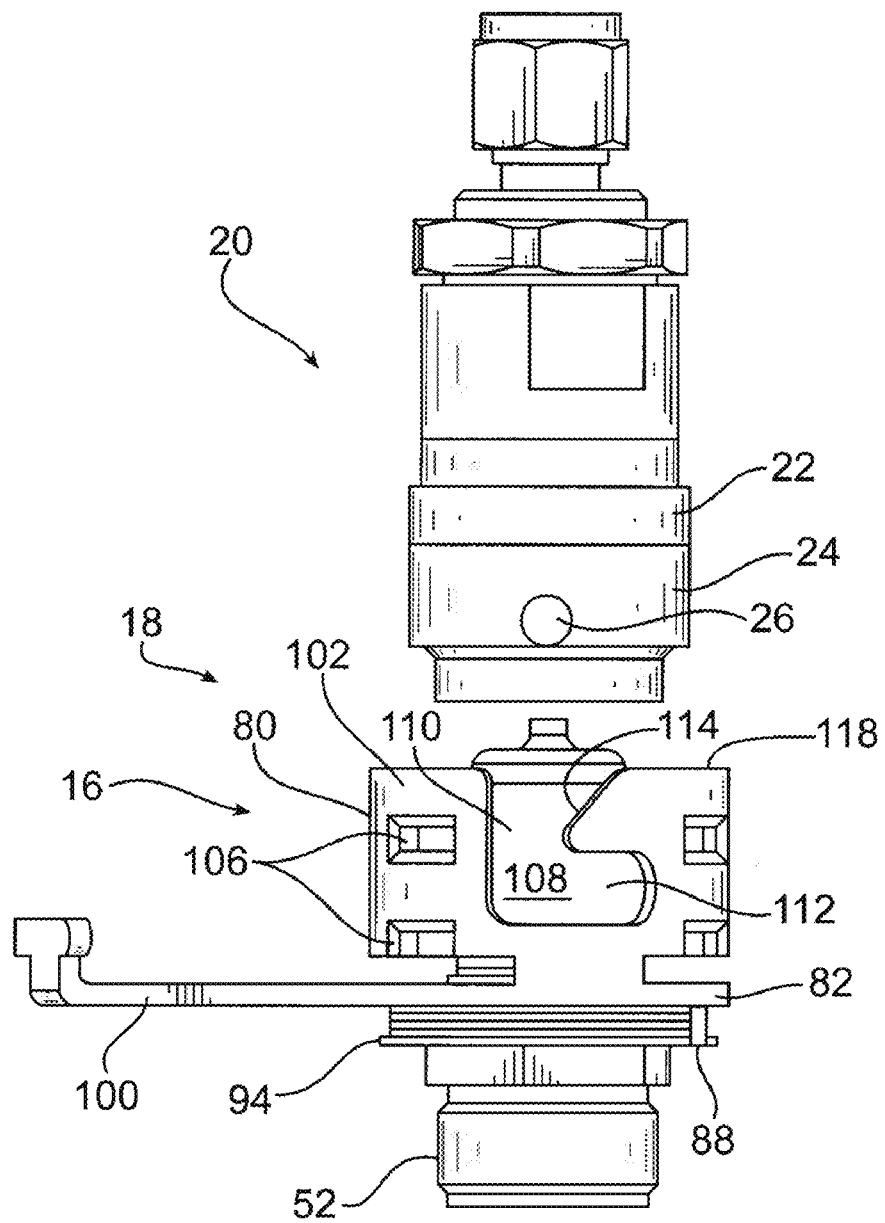
FIG. 2 is a frontal view of the axially aligned, but still separated, coupler and nipple halves in preparation for their coupling assembly.

FIG. 1 is a perspective view showing the axial, vertical alignment of coupler half 20 with nipple half 18, with FIG. 2 showing a frontal view of thereof. Coupler half 20 preferably takes the form of coupler half 20' set forth in detail in FIGS. 5-8 of co-pending U.S. patent application Ser. No. 11/186,534, entitled "Cryogenic Coupling", filed on Jul. 21, 2005, also assigned to the assignee of the present invention and incorporated herein, in its entirety, by reference. Basically, coupler half or assembly 20 (FIGS. 6 and 6a) takes the form of a centrally apertured, shaped, generally tubular body 22, the inner or coupling end of which includes a tapered inlet portion 23 and an adjoining internal sealing member or bushing 21 that is adapted to seal, in slip-fit fashion, with a mating body portion of nipple assembly 18, in a manner well known in the art. Of further importance is that an outer cylindrical surface portion 24 of coupler half 20 is provided with preferably a pair of opposed, radially outwardly-directed rollers 26 or pin (only one of which is shown) that are adapted to interact, in a twisting motion, with PtCHSM 16 of this invention in a manner to be discussed, in detail, later. In addition, coupler half 20 also includes an internal, normally biased-closed, conventional valve assembly 25, the operation of which is also well known in the art.

Figure 8:
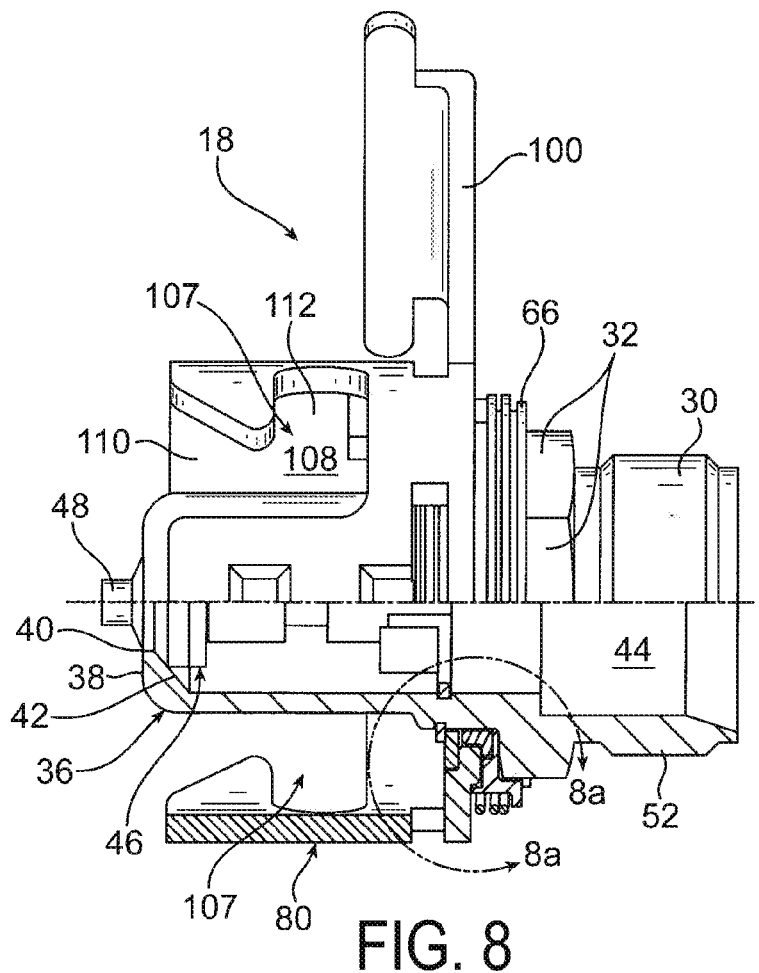
FIG. 8 is a frontal view, partly in section, taken along line 8-8 of FIG. 7.
Figure 10:
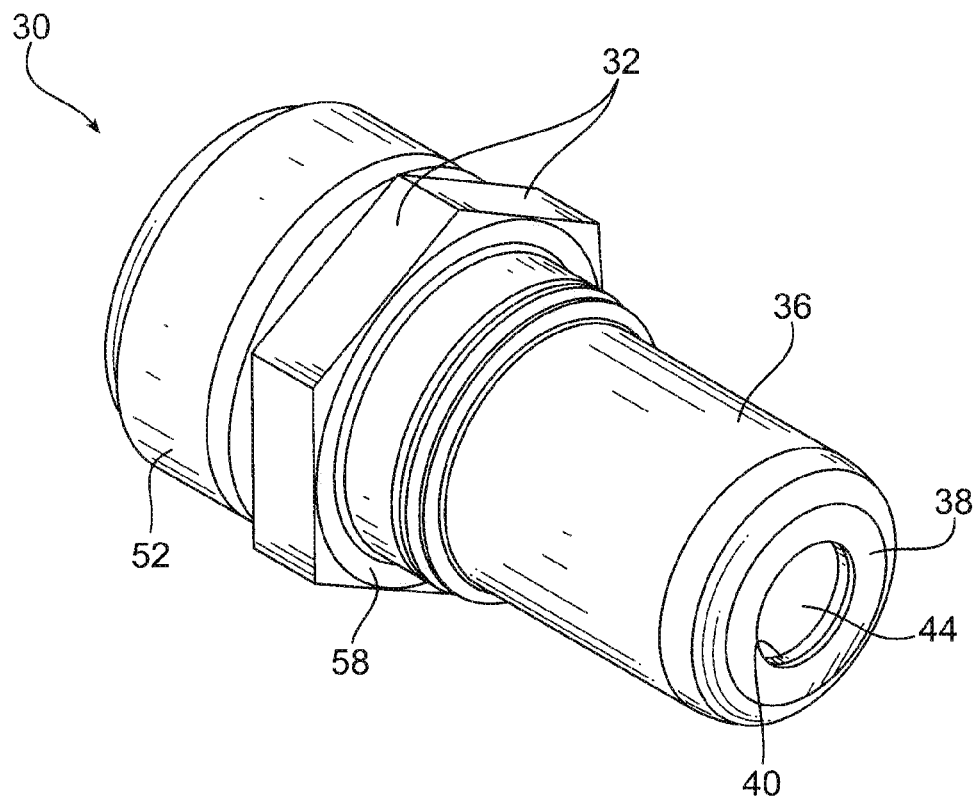
FIG. 10 is a perspective view of the main body portion of the nipple half of the mechanism of the present invention.

Turning now to nipple half or assembly 18, it includes an elongated, generally tubular body portion 30, best seen in FIGS. 8 and 10, which may be provided with a plurality of adjoining intermediate, flat surface or tool portions 32, preferably hexagonal in profile, if so desired. An inner body end 36 is provided with an annular end surface 38 having a central aperture 40 and an internal frusto-conically tapered portion 42. In addition, body portion 30 includes a stepped through bore 44 and an apertured valve guide therein (not shown) that serves to seat one end of a known or conventional valve assembly 46 (FIG. 8), similar in construction and operation to the known internal valve assembly 25 in coupling half 20. Suffice it to say, a head portion 48 of valve assembly 46 extends through central aperture 40 (FIG. 8), with valve assembly 46 being retained in an internal groove 49 in bore 44 via an inner retaining ring 50.

Figure 11:
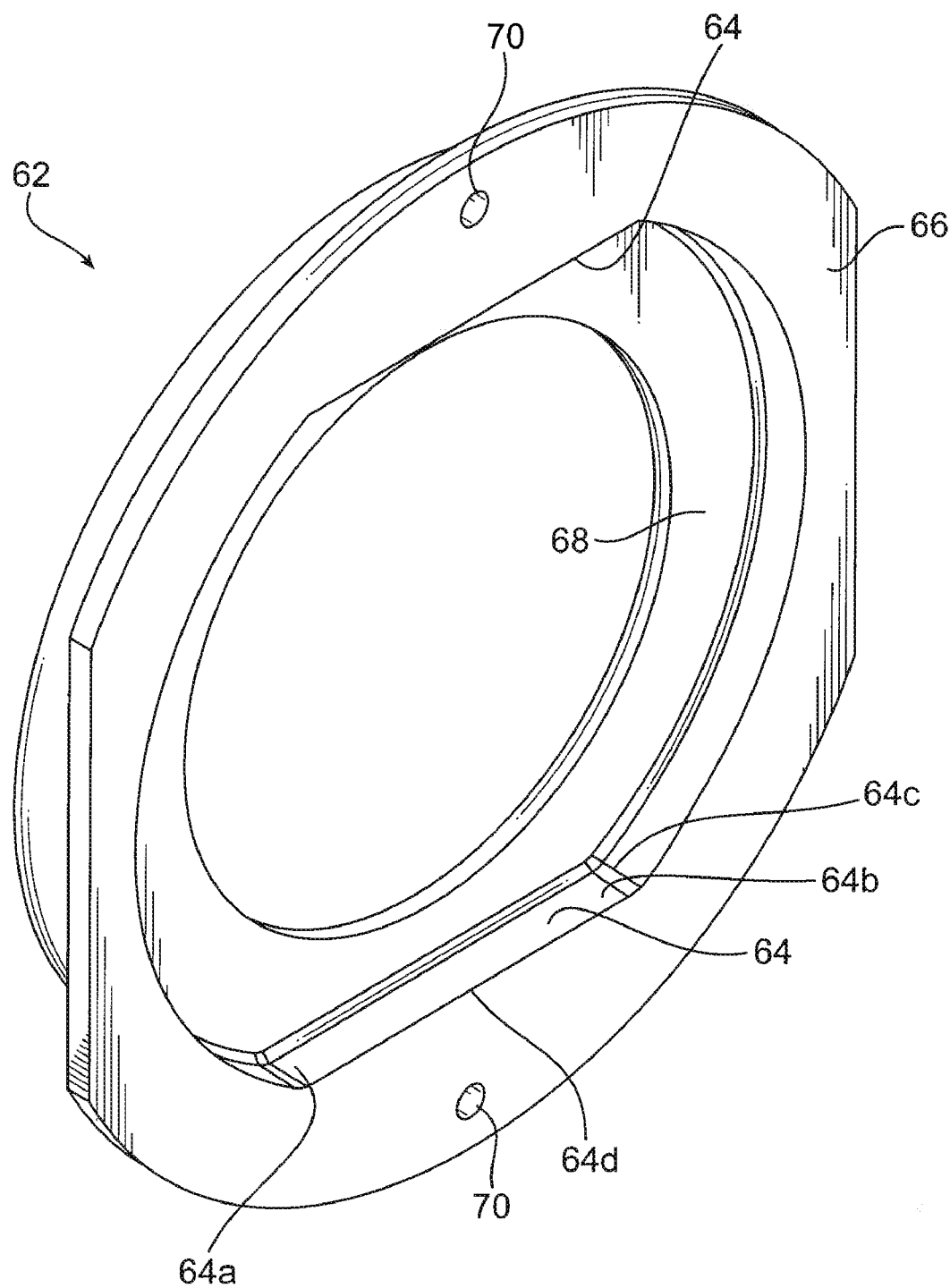
FIG. 11 is a perspective view of a nipple half spring retainer of the mechanism of the present invention.

Body portion 30 also includes an externally threaded outer end portion 52 and an inner annular radial surface 56, adjoining the inner lateral edges of body surfaces 32 and merging into a cylindrical body portion 58, the latter including a peripheral external groove 60. Located on two opposed flat body portions 32 are corresponding opposed flat, rectangular, laterally-directed areas 64 (FIG. 11) of a generally annular spring retainer 62 having an outer flange 66 and a spaced inner flange 68, separated by at least opposed lateral area portions 64, with outer flange 66 having diametrically opposed apertures 70, in areas thereof located radially outwardly from opposed portions 64. Adjoining inner flange portion 68 (FIG. 11) is flange portion 76 (FIG. 8a) of an anti-freeze bearing 72 whose cylindrical portion 74 is journalled on body cylindrical portion 58. Cradled by bearing portions 74 and 76, is a circular inner end portion 82 of a peripheral, generally cup-shaped member or collar 80 that basically surrounds housing inner body 36. It is the function of anti-freeze bearing 72 to prevent collar 80 from becoming frozen to body portion 30 in low temperature operating conditions. Circular end portion 82 is provided with a first plurality of preferably evenly spaced ventilation through holes 84 as well as a second plurality of pin retention holes 86 (only one is shown) also preferably evenly spaced, both relative to through holes 84 and each other. At least one of holes 86 fixedly retains an axially extending cylindrical pin 88 (FIGS. 2-4 and 9) that extends into the width 64c of spring retainer flat area 64 near one end 64a thereof, thus limiting the pivotal movement of collar 80, specifically end portion 82 thereof, between the one end 64a and another end 64b, for the length or extent 64d, therebetween.

Figure 8A:
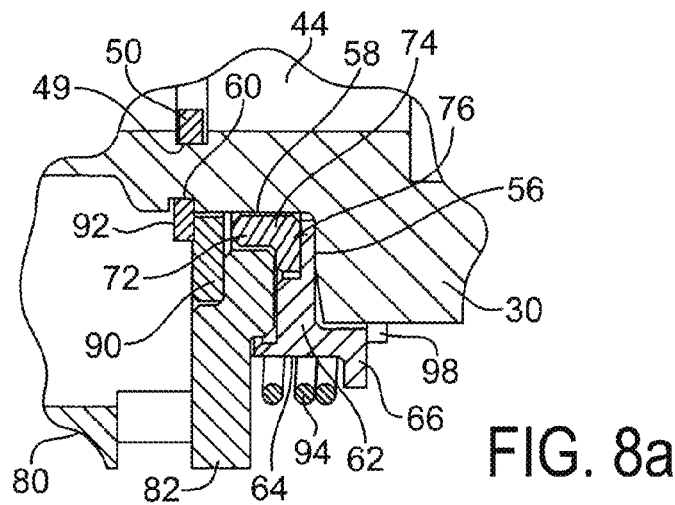
FIG. 8a is an enlarged version of circled area 8a of FIG. 8.

As best seen in FIGS. 8 and 8a, collar end portion 82, together with anti-freeze bearing 72 and spring retainer 62 are retained against axial movement by a restraining washer 90, journalled on cylindrical body portion 58 and held in place by an outer retaining ring 92 received within body external groove 60, in a manner so as to however permit limited pivotal movement, as already described, between collar 80 and nipple body 30.

Figure 4:
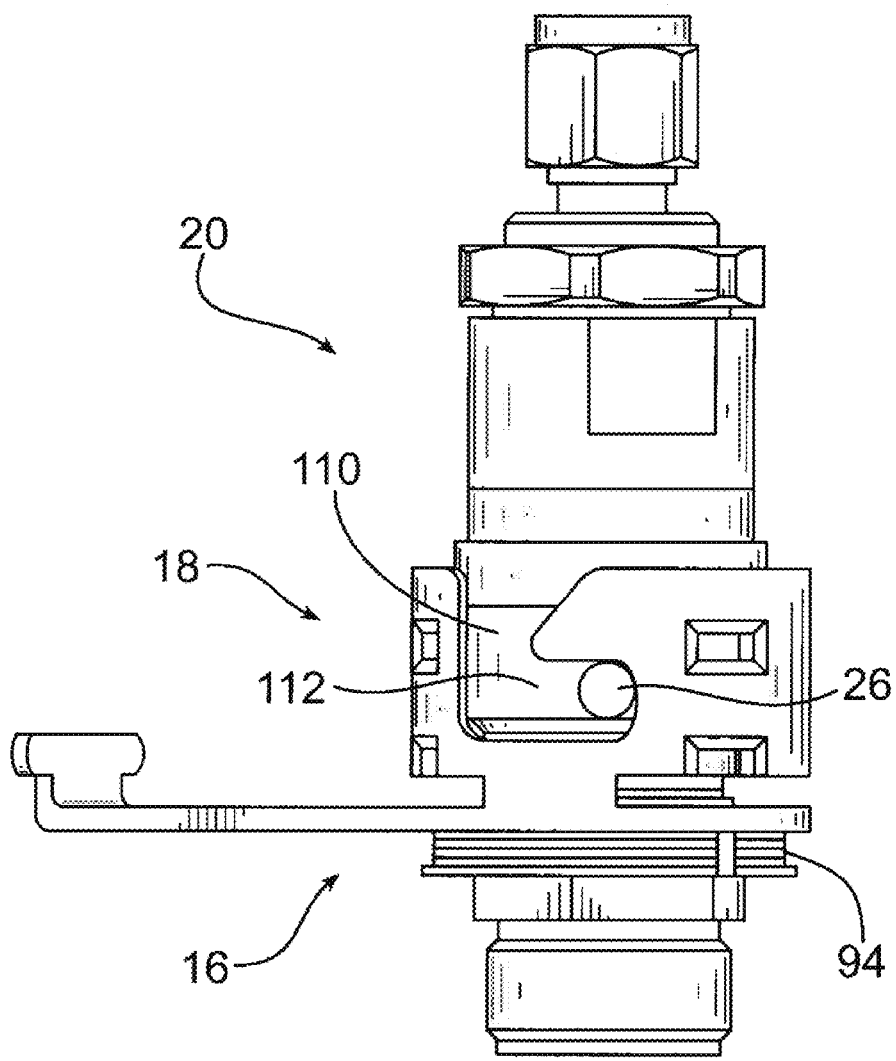
FIG. 4 illustrates the completion of the coupling assembly of the nipple and coupler halves, after the partial rotation of the nipple collar, relative to the coupler half, thereby biasing the coupler rollers into and thus locking the rollers in nipple collar slot locking portions.
Figure 5:
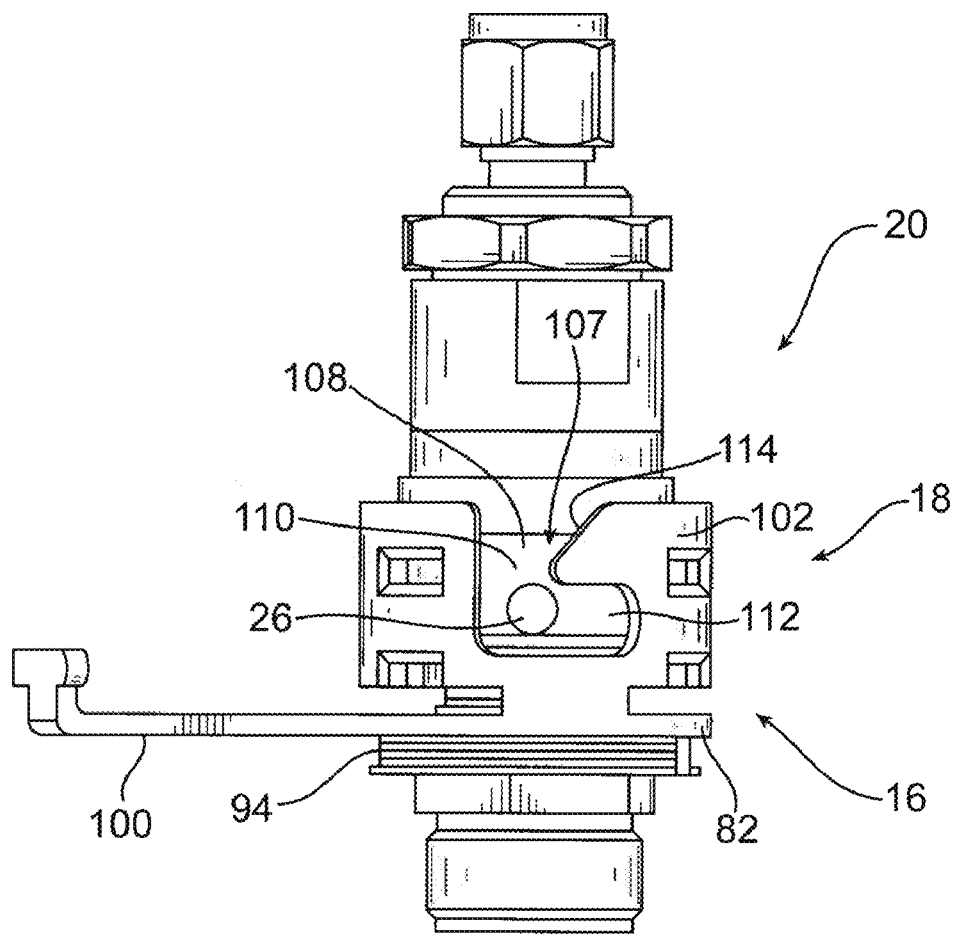
FIG. 5 is similar to FIG. 4 but showing the partial rotary movement of the coupler half relative to the nipple half, thereby freeing the coupler half rollers from the nipple half collar slot locking portions, prior to the linear movement that is still required to fully separate the nipple and coupler halves.
Figure 6:
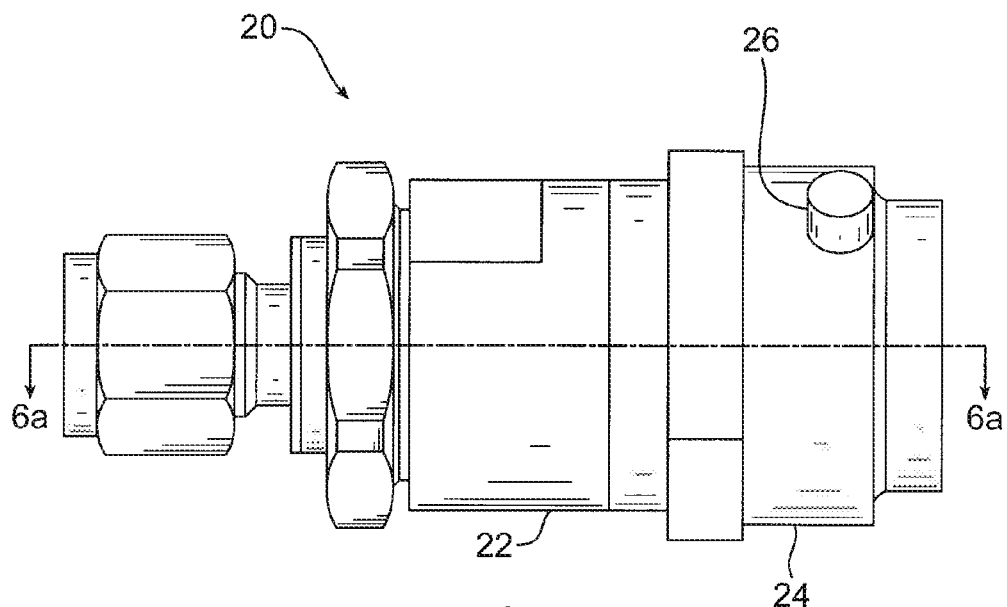
FIG. 6 is a frontal view of the coupler half of the quick disconnect coupling.
Figure 6A:
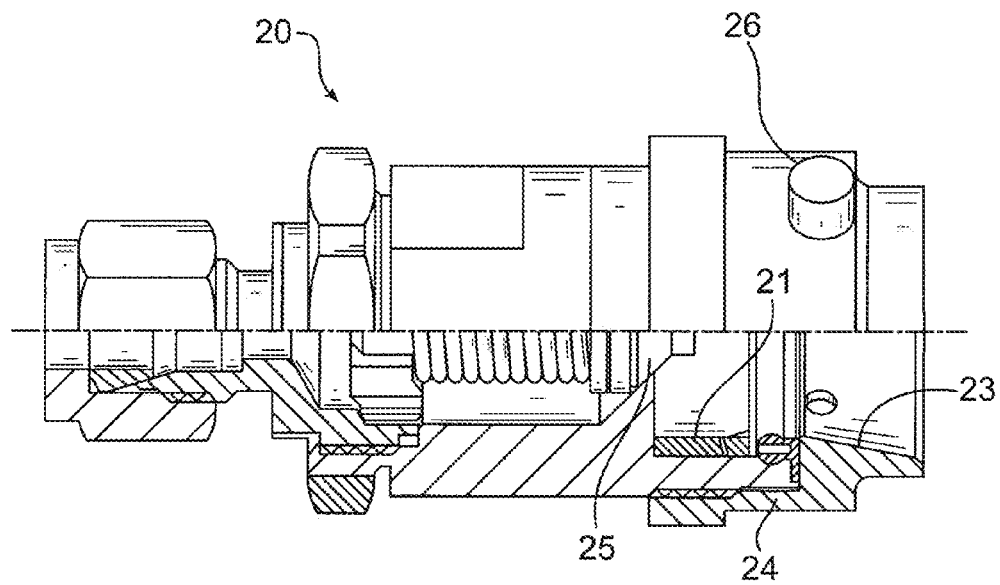
FIG. 6a is a frontal view, partly in longitudinal section, taken along line 6a-6a of FIG. 6.
Figure 7:
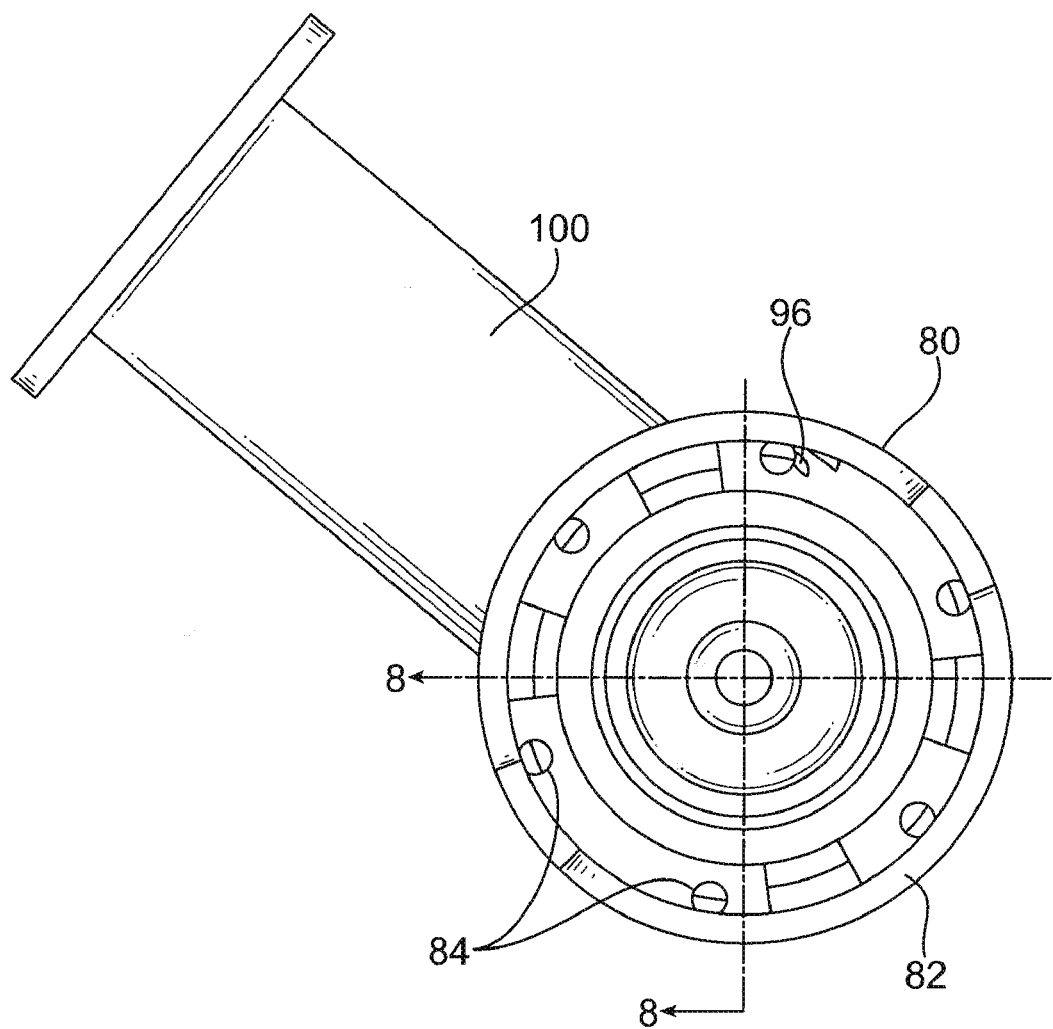
FIG. 7 is a bottom plan view of the nipple half of the quick disconnect coupling that utilizes the mechanism of the present invention.
Figure 9:
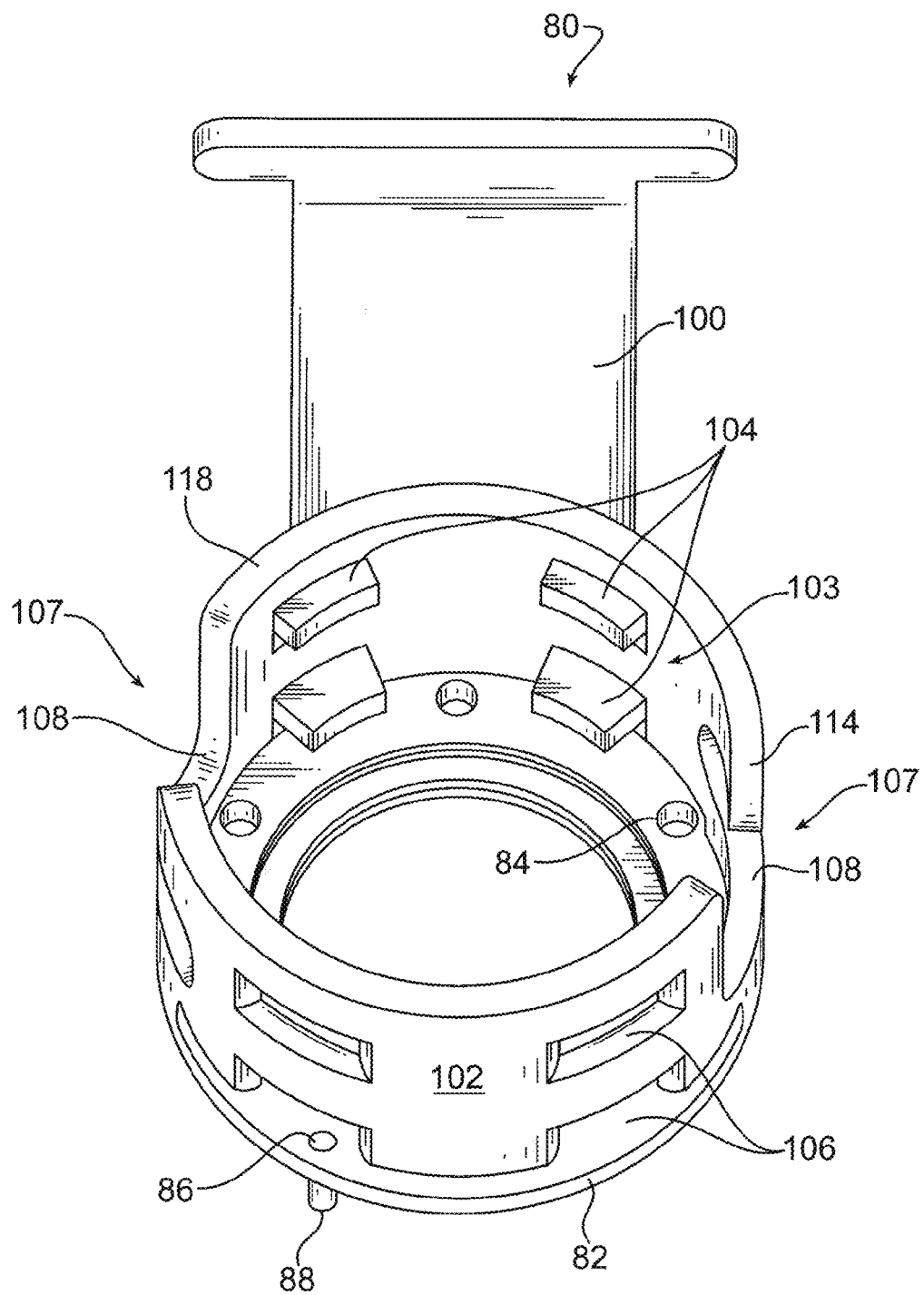
FIG. 9 is a perspective frontal view, looking into the interior, of the collar portion of the mechanism of the present invention.
Figure 12:
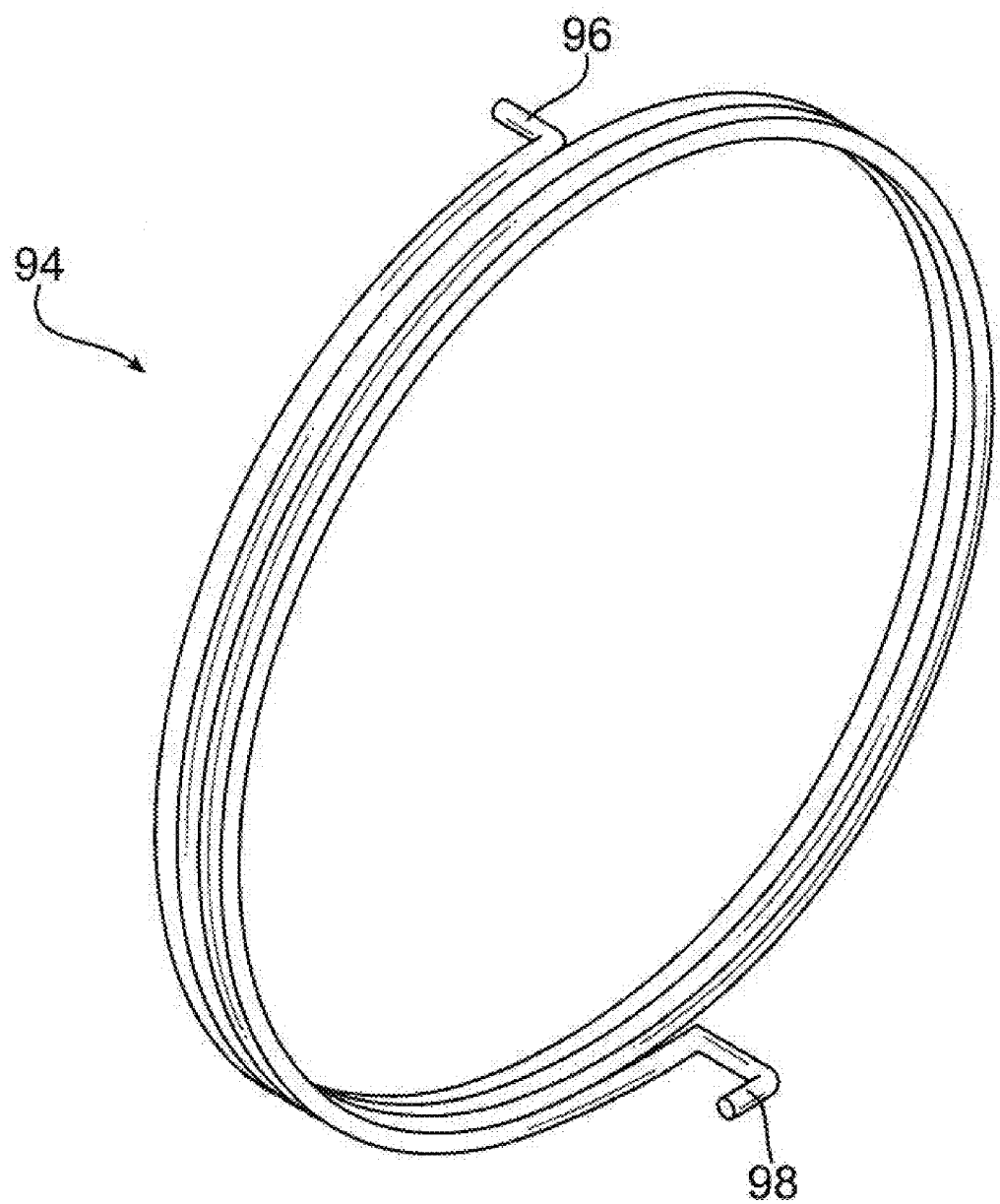
FIG. 12 is a perspective view of a collar spring that is operatively interposed between the body portion and the collar of nipple half of the mechanism of the present invention.

Interposed between collar annular end portion 82 and spring retainer outer flange 66, is a multiple loop coil, winding collar or biasing spring 94 (FIG. 12) whose inner end 96 is hooked through one of collar ventilating holes 84 while its outer end 98 is hooked through one of spring retainer apertures 70 with tension applied, so that an operator-initiated pivotal movement of collar 80, in the circumferential direction away from spring retainer flat area end 64a and toward flat area end 64b, results in the windup of collar spring 94. Spring retainer flat areas 64 slide over corresponding body flat surfaces 32 with this, in turn, securing spring retainer 62 against rotation as well as supplying tension to collar spring 94, once spring end 98 (FIG. 12) is secured in spring retainer 70 (FIG. 11), Continuing with cup-shaped member or collar 80, its circular end portion 82 also includes a radially outwardly-directed tab or actuation handle 100 that permits a human operator to easily and readily pivot collar 80 against the restraining action of collar spring 94 when the disassembly, to be discussed in detail later, of quick-disconnect coupling 14 is initiated, as is illustrated in FIGS. 4 and 5, when collar 80 is pivoted or indexed in a counterclockwise direction. This is best understood by viewing the position of collar 80 relative to roller 26 in FIGS. 4 and 5. Collar 80 also includes a generally cylindrical portion 102 which is provided on its inside peripheral surface, as best seen in FIG. 9, with a coupling misconnect prevention mechanism 103, forms of which include at least one radially inwardly-projecting continuous peripheral ridge or rib (not shown per se) or a segmented ridge 104 as well as a plurality of peripherally and/or axially spaced individual ridges or tabs 104 that function to prevent the connection of coupler assemblies, other than coupler half assembly 20, specifically designed for use in quick disconnect coupling 14, by blocking any slip fit mating with a coupler half that utilizes an outer cylindrical surface portion of a diametral extent greater than that of portion 24 of coupler half 20 (FIGS. 6, 6a). Other such ridge designs, including axially-directed ridges can also be utilized. Furthermore, collar cylindrical portion 102 additionally includes peripherally as well as axially spaced pluralities of arced cutouts, openings or relief areas 106 that facilitate air movement during the assembly/disassembly of quick-disconnect coupling 14.

Turning now specifically to FIGS. 2-5 and 9, cup member cylindrical portion 102 also utilizes two diametrically opposed, locking devices 107, basically in the form of L-shaped, formed cutouts or contoured slots 108, each of which includes an axially-extending outlet slot portion 110 (FIG. 5) whose inner end that merges into an adjoining end of a peripherally-extending locking slot portion 112 (FIG. 4) and a helically-directed, angled, ramp or inlet slot portion 114 (FIG. 3) that starts at an outer annular edge 118 of cup portion 102 and terminates inwardly thereof by merging into the adjoining end of locking slot portion 112.

Figure 3:
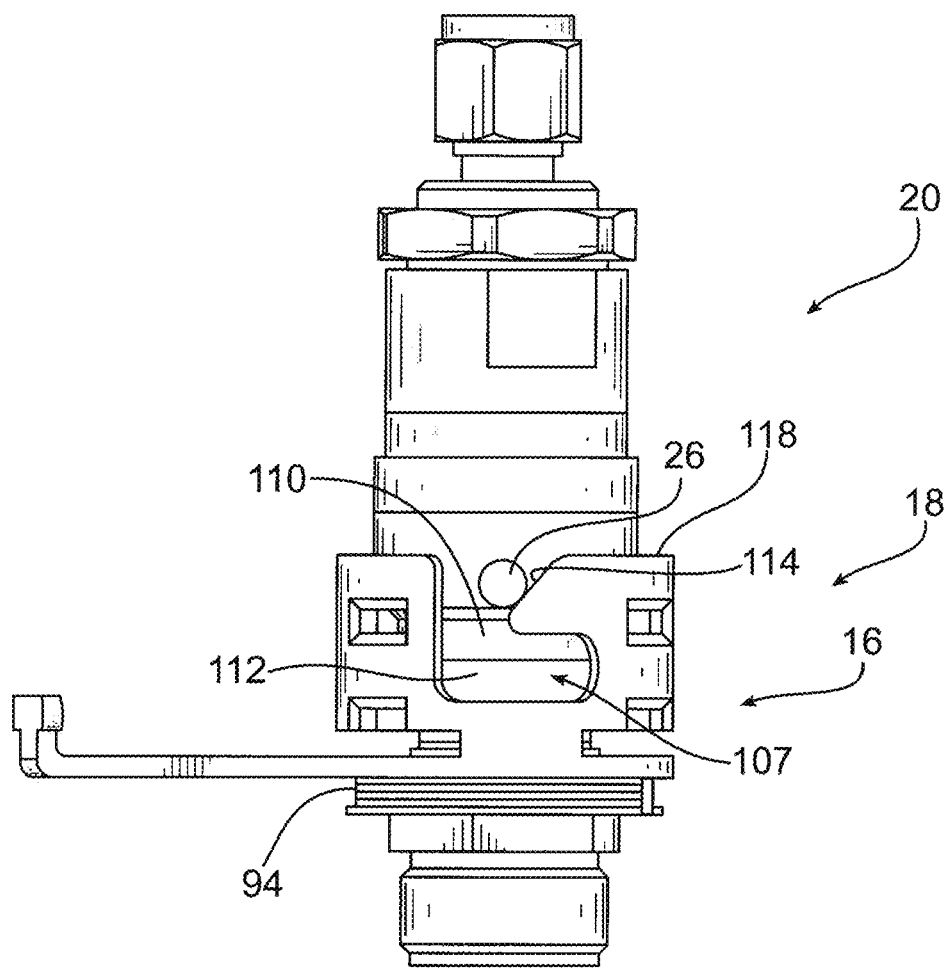
FIG. 3 is a view similar to that of FIG. 2 during the assembly process, at the time when the nipple half rollers come into linear contact with helically tapered portions of the coupler half collar slots.

In terms of operation, in the assembly of quick disconnect coupling 14, attention is directed to the assembly sequence specifically set forth in FIGS. 2-4. FIG. 2 illustrates the axially aligned, but still axially separated coupler half 20 and nipple half 18. It should, of course, be understood that the distal ends of coupler and nipple halves 20, 18, respectively, are operatively interconnected with additional fluid delivery apparatuses (not shown) of any desired type. FIG. 3 illustrates the start of the mating or assembly process between coupler halves 18 and 20. Specifically, a human operator has started the mating process, wherein opposed rollers 26 (one being shown) of coupler half 20 have made contact with opposed helical ramp inlet slot portions 114 (one being shown). FIG. 4 illustrates the completion of the coupling or assembly of coupler half 20 with nipple half 18. Coupler half rollers 26 have now traveled over inlet slot portion 114 and have entered into and are now located at the distal end of locking slot portion 112. It should be evident, at this time, that PtCHSM 16 of this invention is basically a rotating locking device that, in the form of a rotatable cup-shaped member 80, having opposed, generally L-shaped cutouts or slots 108, including a helical ramp inlet slot portion 114, is rotationally spring coupled via biasing or collar spring 94, for limited pivotal movement thereof, to a known nipple assembly 18. PtCHSM 16 functions by being actuated via the linear movement of a known coupler half 20, relative to nipple half 18, wherein rollers 20 of the former initially contact helical ramp inlet slot portion 114 of the latter and, as a result of the continuing axial advancement of coupler half 20 and the helical ramp angle of inlet slot portion 114 causing cup-shaped member 80 to rotationally pivot, thereby permitting rollers 26 to enter the proximate end of locking slot portion 112. The noted rotational pivoting of member 80 also winds up or additionally tensions collar spring 94 so that, once rollers 26 enter circumferentially-extending slot portions 112, collar spring 94 unwinds and rotationally moves member 80 until rollers 26 abut the distal ends of locking slot portion 112, as shown in FIG. 4. If desired, the unwinding action of collar spring 94 can be manually augmented by operator-manipulation of actuating handle 100 in the clockwise direction.

In terms of the disassembly of quick disconnect coupling 14, i. e., proceeding from the FIG. 4 showing, wherein rollers 26 are located at the distal ends of locking slot portions 112, to the FIG. 5 showing, where rollers 16 are located near the proximate end of locking slot portion 112, the bias of collar spring 94 is overridden by operator-manipulation of actuator handle 100 in the counterclockwise direction. Once rollers 26 are in the FIG. 5 position, quick disconnect coupling 14 can be pulled apart by axially separating nipple assembly 18 and coupler assembly 20, with full separation thereof occurring once rollers 26 have fully exited from outlet slot portion 110, with coupler assemblies 18 and 20 then again being in the relative positions shown in FIGS. 1 and 2.

While helical slot-type mechanisms have been used as locking devices in prior art constructions with quick disconnect couplings, all such known devices have one half of such couplings fixedly mounted in position, with the connecting or locking action being accomplished by turning or twisting either one half of the coupling or part of the coupling. In contrast thereto, in the PtCHSM 16 of the present invention, it is cup-shaped member or collar 80 that includes opposing locking devices 107, with collar portion 80 moving in rotation while the connection between the coupler halves 18 and 20, via opposed rollers 26, is being accomplished in an axial movement, in the manner previously described. Thus, PtCHSM 16 of the present invention uses biasing or collar spring 94 to make a basically automatic connection. It should be understood, at this time, that collar spring 94, as soon as the noted automatic connection has been accomplished, returns collar 80 to its home or at-rest position, ready for another connection.

It is deemed that one of ordinary skill in the art will readily recognize that the present invention fills remaining needs in this art and will be able to effect various changes, substitutions of equivalents and various other aspects of the invention as described herein. Thus, it is intended that the protection granted hereon be limited only by the scope of the appended claims and their equivalents.

What is claimed is:

1. A quick disconnect coupling comprising:
    a coupler assembly having a generally tubular body; an inlet portion and a generally cylindrical outer surface portion including a pair of radially outwardly-directed pins; and
    a nipple assembly having a generally tubular body; an inner body end; a push-to-connect mechanism including:
        a cup-shaped member concentrically surrounding said inner body, the cup-shaped member having a pair of opposed slots each including an entry slot portion and a locking slot portion having a proximal end connected to the entry slot portion and a distal end, and the cup-shaped member being rotatably journalled on said nipple assembly tubular body for limited rotational pivoting relative thereto; and
        a biasing member normally biasing said cup-shaped member in a first rotational direction to an at-rest position relative to said nipple assembly tubular body,
    wherein with said nipple inner body end being sealingly received within said coupler assembly, said coupler and nipple assemblies are interconnected via said coupler assembly pins each being received through a respective one of said entry slot portions and advanced therethrough into a respective one of said locking slot portions of said nipple assembly cup-shaped member, and
    wherein as the pins are advanced through the entry slot portions, the cup-shaped member is pivoted by the engagement of the pins with the entry slot portions in a second rotational direction opposite the first rotation direction allowing the pins to be received into the locking slot portions whereupon the biasing member returns the cup-shaped member back to its at-rest position disposing the pins in the distal end of said locking slot portion and locking the nipple assembly to the coupler assembly.

2. The quick disconnect coupling combination of claim 1, wherein said cup-shaped member further includes a radially outwardly-directed operator actuating handle for manually pivoting said cup-shaped member against the action of said biasing member.

3. The quick disconnect coupling combination of claim 2, wherein said actuating handle extends radially outwardly from said cup-shaped member.

4. The quick disconnect coupling combination of claim 1, wherein said biasing member takes the form of a tensioned spring.

5. The quick disconnect coupling combination of claim 4, wherein said push-to-connect mechanism further includes a generally annular retainer for confining said tensioned spring, said retainer being secured, against rotation, on said nipple assembly body and having one end of said tensioned spring secured thereon.

6. The quick disconnect coupling combination of claim 5, wherein said retainer includes spaced, parallel, flange portions, including at least one intermediate flat surface portion.

7. The quick disconnect coupling assembly of claim 6, wherein an end portion of said cup-shaped member includes at least one axially extending pin member, said pin member extending into said retainer flat surface area portion, with lateral ends of said flat surface area portion serving to limit the rotational/pivotal movement of said cup-shaped member relative to said nipple assembly tubular body.

8. The quick disconnect coupling assembly of claim 7, wherein another end of said tensioned spring is secured to said end portion of said cup-shaped member, with said rotational/pivotal movement of said cup-shaped member, in one direction, further tensioning said spring.

9. The quick disconnect coupling combination of claim 1, wherein said push-to-connect mechanism further includes an anti-freeze bearing, interposed between said nipple assembly tubular body and said cup-shaped member for preventing said cup-shaped member from freezing to said nipple assembly tubular body during low temperature operating conditions.

10. The quick disconnect coupling assembly of claim 1, wherein said cup-shaped member further includes, on an inner peripheral surface thereof, a coupling-misconnect prevention mechanism for preventing the connection with coupler assemblies other than said coupler assembly.

11. The quick disconnect coupling assembly of claim 10, wherein said coupling-misconnect prevention mechanism includes at least one radially inwardly-projecting rib.

12. The quick disconnect coupling assembly of claim 11, wherein said rib is peripherally-extending and one of continuous and segmented.

13. The quick disconnect coupling assembly of claim 10, wherein said coupling-misconnect prevention mechanism includes at least one of a plurality of peripherally and/or axially spaced individual tabs.

14. The quick disconnect coupling assembly of claim 1, wherein at least portions of said pair of opposed, basically L-shaped, slots are similarly circumferentially directed.

15. In a quick disconnect coupler half and nipple half assembly combination, a method for operatively and lockingly interconnecting said coupler and nipple halves, said method including the steps of:
    a. axially aligning said coupler and nipple halves, with said coupler half including an outer surface portion having at least one radially outwardly-directed pin axially aligned with a push-to-connect mechanism including:
        a cup-shaped member rotatably journalled on said nipple half, said cup-shaped member being normally biased, in one rotational direction, for limited rotational pivoting relative to said nipple half, to an at-rest position, by a tensioned biasing member, and the cup-shaped member having a pair of opposed slots each including an entry slot portion and a locking slot portion having a proximal end connected to the entry slot portion and a distal end;
    b. receiving each said pin in a corresponding one of the entry slot portions; and
    c. advancing the pins through the entry slot portions thereby pivoting by the engagement of the pins with the slot portions said cup-shaped member in a second rotational direction opposite said first rotational direction allowing each of the pins to be received into a corresponding locking slot portion whereupon said biasing member returns said cup-shaped member back to its at-rest position disposing the pins in the distal end of said locking slot portion and locking said nipple half to said coupler half.

16. The assembly method of claim 15, further including a subsequent disassembly method, said disassembly method including the additional steps of:
   d. manually biasing said cup-shaped member in the second rotational direction until each said pin enters the entry slot portion;
   e. axially separating the nipple half and the coupler half until each said is removed from said cup-shaped member; and
   f. removing the manual biasing of said cup-shaped member whereupon said biasing member returns said cup-shaped member back to its at-rest position.

* * * * *

UNITED STATES PATENT AND TRADEMARK OFFICE
CERTIFICATE OF CORRECTION

| | | |
|---|---|---|
| PATENT NO. | : 7,681,925 B2 | Page 1 of 1 |
| APPLICATION NO. | : 11/422606 | |
| DATED | : March 23, 2010 | |
| INVENTOR(S) | : Todd L. Lambert et al. | |

It is certified that error appears in the above-identified patent and that said Letters Patent is hereby corrected as shown below:

Title Page, Line 75, delete "Brian K. Forner", and insert therefore -- Brian F. Foner --.

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,681,925 B2 | Page 1 of 1 |
| APPLICATION NO. | : 11/422606 | |
| DATED | : March 23, 2010 | |
| INVENTOR(S) | : Todd D. Lambert et al. | |

It is certified that error appears in the above-identified patent and that said Letters Patent is hereby corrected as shown below:

Title Page, Line 75, delete "Brian K. Forner", and insert therefore -- Brian K. Foner --.

This certificate supersedes the Certificate of Correction issued May 4, 2010.

Signed and Sealed this

Twentieth Day of July, 2010

David J. Kappos
*Director of the United States Patent and Trademark Office*